Jan. 10, 1950 W. E. TRUCE 2,494,148
METHOD OF PURIFYING LACTALBUMIN
Filed Jan. 22, 1947
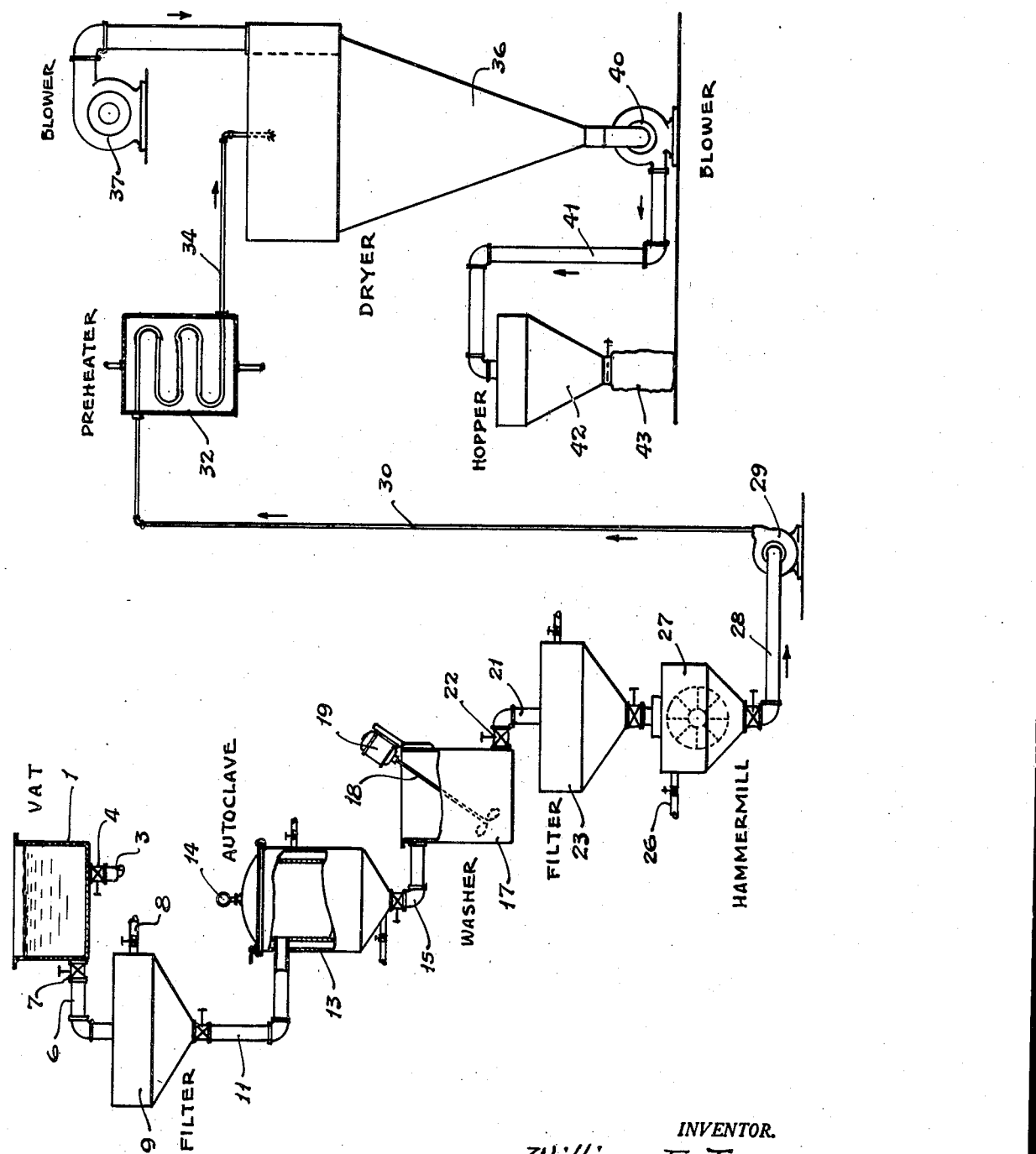
INVENTOR.
William E. Truce
BY
R. G. Story
ATTORNEY Patented Jan. 10, 1950

2,494,148

UNITED STATES PATENT OFFICE 2,494,148

METHOD OF PURIFYING LACTALBUMIN

William E. Truce, La Fayette, Ind., assignor to Swift & Company, Chicago, Ill., a corporation of Illinois Application January 22, 1947, Serial No. 723,625

6 Claims. (Cl. 260—122)

The present invention relates to the treatment of lactalbumin, and more particularly to a method of purifying lactalbumin.

Lactalbumin, a heat-coagulable protein, is found in milk to the extent of about 0.5 per cent. Since lactalbumin is not precipitated with the casein in cheese-making, it remains as an important ingredient in whey, along with other substances, such as lactose, mineral constituents and traces of casein and fat.

Milk albumin, or lactalbumin, is recognized as a valuable protein. It contains the essential amino acids and, therefore, if taken in sufficient amounts is capable of satisfying the protein requirements of the animal organism.

Lactalbumin may be obtained from whey by the saturation thereof with certain salts followed by dilution, acidulation and, finally, long standing to effect crystallization. Another method of recovering lactalbumin from whey is to coagulate lactalbumin by means of heat. Lactalbumin may also be obtained from whey by precipitation with acid and heat. These methods of recovering lactalbumin from whey are inefficient and productive of an inferior product, to the extent that heretofore whey has been utilized largely as an animal feed rather than a valuable source of lactalbumin.

A practical and efficient method of recovering lactalbumin from whey comprises the steps of neutralizing the whey to a point of total titratable acidity as lactic acid below 0.12 per cent, that is, to a point below that at which the lactalbumin is coagulated when heated within the heat-coagulable temperature range thereof. This initial neutralization step is performed at a temperature below the heat-coagulable temperature range of lactalbumin, or under 155° F. Following the neutralization step the whey is heated to within the coagulable temperature range of lactalbumin, that is, between about 155° F. and about 215° F., after which there is carefully added in straightline flow, while maintaining the whey in a quiescent state, sufficient acid to bring the total titratable acidity of whey as lactic acid between about 0.15 per cent and 0.30 per cent. By following this procedure the lactalbumin forms in large clumps or curds which may be skimmed off the surface of the whey.

Lactalbumin recovered in accordance with methods such as the foregoing does not possess the degree of purity desired for pharmaceutical uses. For example, the lactalbumin clumps or curds prepared by the process herein disclosed, after being allowed to drain, are soft and gel-like and possess a solids content between about 15 and 20 per cent of which only about 50 to 60 per cent is protein, the remainder being lactose and minerals contained in the liquid retained by the lactalbumin. This crude lactalbumin is not suitable for most pharmaceutical purposes, which require a protein content of about 70 per cent or above. Since some of the salts and lactose, or milk sugar, found in the crude lactalbumin are water soluble, it would seem expedient merely to wash the crude lactalbumin to remove the water-soluble materials therefrom. It has been found, however, that because of the gelatinous nature of the crude lactalbumin, washing is often ineffective in raising the protein content thereof. The water retained by the lactalbumin and containing the lactose and minerals is so bound with the protein in a gel-like structure that repeated washings of the crude material do not increase the protein content the desired amount.

It is an object, therefore, of this invention to facilitate the purifying of lactalbumin and make possible the preperation of a superior lactalbumin product.

In accordance with the invention, it is proposed to break the gel-like structure of the crude lactalbumin to free the moisture bound thereby, and thus permit washing of the protein.

It is contemplated by the invention to destroy the water holding properties of the crude lactalbumin by means of heat or heat and pressure under such controlled conditions that destruction of the gel structure of crude lactalbumin is effected without destroying the protein molecule. Conditions of temperature and pressure are such as to cause destabilization of the protein and more particularly if the gel structure of the curd without degradation of the protein molecule, such as hydrolysis thereof.

In carrying out the invention, crude lactalbumin such as obtained in accordance with the process described herein, or any other difficultly washed crude lactalbumin, is subjected to a heat treatment with or without pressure for a sufficient period of time to cause destabilization of the protein molecule and thereby permit washing of the destabilized protein, as evidenced by the ready loss of water therefrom by draining a mixture thereof with water. By repeated washings of the properly destabilized protein the lactose and some mineral constituents are removed from the crude lactalbumin and the protein content consequently increased. If desired, the washed lactalbumin may be dried, as hereinafter more fully described.

In one embodiment of the invention, destabilization of the protein molecule is effected, without hydrolyzing the same, by boiling the lactalbumin curds or clumps in an amount of water sufficient to prevent scorching, or burning, of the protein, and for a sufficient period of time, for example, about one-half hour. The destabilized protein is then washed by agitating with water and then the water allowed to drain therefrom. Water freely leaves the destabilized protein molecule. By repeating the washings, additional amounts of lactose and minerals are removed from the crude lactalbumin with a consequent rise in protein content. The foregoing procedure may result in protein yields representing about 80 per cent or more of the solids content of the treated lactalbumin product.

It is understood that the amount of water in which the crude lactalbumin is boiled may vary widely. Since the water serves to wash the destabilized protein the upper limits of the amounts thereof are to be determined by the capacity of the equipment employed and the expense of heating large quantities of material. The lower limits of water are sufficiently high to prevent scorching, or burning, of the protein matter. A lower limit of about 1 volume of water for 1 volume of crude lactalbumin has been found satisfactory, a suitable operating ratio being about 2 to 3 volumes of water for 1 volume of crude lactalbumin.

The boiling time is preferably such as to cause destabilization of all of the protein matter and not, for example, only of the surface thereof, thus leaving the interior unaffected. On the other hand boiling should not be prolonged to the point that hydrolysis of the protein molecule occurs, for the subsequent washing operations remove valuable fragments of protein material, thus detracting from the value of the final product. A boiling period of about 30 minutes is suitable in most cases, although a period of 20 minutes, especially where boiling is vigorous and 40 minutes, where boiling approaches only simmering intensity, have been found to be satisfactory.

In another embodiment of the invention, the gel structure of the crude lactalbumin may be destroyed with smaller volumes of water than are employed in the boiling process described above. The crude lactalbumin may be autoclaved, i. e., subjected to the action of steam under pressure in a closed chamber or container. I have found that the gel structure of the crude lactalbumin is broken in an autoclave in about 15 minutes at about 15 pounds steam pressure. It is understood that these conditions may vary over a wide range. Generally, the higher the pressure the less time required for the destruction of the gel, and the lower the pressure the more time required for the destabilization of the protein. It is preferred not to employ pressures in excess of 15 pounds. For example, 10 to 30 minutes at a pressure of about 5 to 10 pounds, and 5 to 20 minutes at a pressure of about 15 pounds have been found to be suitable operating conditions in autoclaving crude lactalbumin to effect the destabilization thereof without injury to the protein molecule.

Following the destabilization and washing operations, the resulting lactalbumin is in condition for drying. The destabilized, washed lactalbumin may be spray-dried, roll-dried, or shelf-dried. Before spray-drying, the mass of lactalbumin is broken up into small granular pieces and the proper fluidity for spray-drying effected. Suitable apparatus for subdividing the lactalbumin mass is, for example, a hammer mill. While the lactalbumin passes through the mill the proper fluidity may be imparted to the resulting granules by the addition of water to cause a thin lactalbumin slurry or stream containing from about 5 to 15 per cent solids, a solids content of about 10 per cent being preferred in the spray-drying operation. The lactalbumin dries to a powder containing a high protein content.

The accompanying drawing illustrates diagrammatically a preferred embodiment of the invention.

In the drawing, the numeral 1 indicates a vat wherein the lactalbumin may be precipitated from the whey. The vat is provided with an outlet 3 having valve 4, through which excess liquid remaining after the formation of lactalbumin may be drained. Precipitated lactalbumin may be charged through line 6, provided with valve 7, to rotary filter 9 provided with a filtrate discharge line 8. In place of a rotary filter I may employ other means for the expulsion of moisture from the crude lactalbumin, such as a filter press or a centrifuge. The crude lactalbumin is conducted through line 11 to vessel 13. Vessel 13 is preferably a heat jacketed container, which may be employed for either boiling or autoclaving the crude lactalbumin contained therein, and is provided with gauge 14 for recording pressures desired to be maintained therein. Following the destabilization operation, the destabilized protein is transferred through line 15 to washing tank 17. Washing tank 17 is provided with suitable agitating means 18 which may be affixed to the side thereof and driven by motor 19. The tank 17 may be provided with a water inlet and outlet, not shown, employed in washing the charged lactalbumin. The washed lactalbumin is introduced through line 21, provided with valve 22, into rotary filter 23 or other suitable means, such as a centrifuge or filter press to separate water from the lactalbumin. The pressed lactalbumin is next charged to hammer mill 27, or similar apparatus for crushing or subdividing the protein. During the comminuting operation in mill 27, water is introduced therein through line 26, whereby a slurry of desired dilution may be formed. The lactalbumin slurry leaves hammer mill 27 through line 28 and, by means of pump 29, charged through line 30, preheater 32 and line 34 to spray-drier 36. Drier 36 is provided with a blower 37 for the introduction of heated air therein. Dry lactalbumin accumulates at the bottom of drier 36 and by means of blower 40 is forced through line 41 into collecting hopper 42, whence it may be removed from the bottom thereof into bag 43 or other suitable container.

As an example of the invention an amount of whey having a total titratable acid content of about 0.2 per cent was neutralized at a temperature of about 70° F. with a mixture consisting of equal proportions of sodium carbonate and sodium bicarbonate. The neutralized whey was then heated to a temperature of 190° F., after which a 15 per cent solution of hydrochloric acid was added down the side of the vessel to bring the total titratable acidity of the whey (as lactic acid) to about 0.25 per cent. A lactalbumin curd formed at the bottom of the vessel, and was scraped free therefrom. Lactalbumin curds also formed throughout the body of the whey and rose to the top, whence they were skimmed off and allowed to drain. The lactalbumin mass having a solids content of about 17 per cent, with a protein proportion therein of about 62 per cent, was mixed with 2 volumes of water and the resulting mixture boiled for one-half hour. After the boiling operation the water drained freely from the lactalbumin. The lactalbumin was again mixed with 1½ volumes of lukewarm water and the mixture agitated for about 5 minutes, after which the water was again drained off. The procedure of agitating and washing was repeated twice. The final protein proportion in the solids content was about 81 per cent. The protein product was then sent through a hammer mill, and while passing therethrough, sufficient water was added to bring the solids content of the resulting stream down to 10 per cent. This stream was then spray-dried into a white lactalbumin powder.

As a further illustrative example of the invention a quantity of lactalbumin product obtained in accordance with the procedure outlined in the foregoing example and having a solids content of about 20 per cent, of which 50 per cent was protein, was placed on a screen in an autoclave. Sufficient steam was introduced therein to effect a pressure of about 15 pounds per square inch. After about 15 minutes the product was withdrawn and washed by agitating with 2 volumes of water and then draining. The spray-dried lactalbumin powder contained 82 per cent of protein.

Obviously, many modifications and variations of the invention, as hereinbefore set forth, may be made without departing from the spirit and scope thereof, and therefore only such limitations should be imposed as are indicated in the appended claims.

I claim:

1. In a process of destabilizing gel-like aqueous curds of crude lactalbumin precipitated from whey without forming a solution of lactalbumin, the steps which comprise: heating in the presence of moisture the said curds of lactalbumin which have been separated from the whey to a temperature at least approximately the boiling point of water for a period of at least approximately 5 minutes while maintaining the lactalbumin in the solid state, and discontinuing the said heating before the said lactalbumin is hydrolyzed; thereby destabilizing the gel-like structure of the curds so that lactose and minerals normally associated with the crude lactalbumin may be readily washed therefrom.

2. In a process of destabilizing gel-like aqueous curds of lactalbumin precipitated from whey without forming a solution of the lactalbumin, the step which comprises subjecting said aqueous curds of lactalbumin which have been separated from the whey to the action of steam under pressure while maintaining the lactalbumin in a solid state to destabilize the protein and discontinuing said action before the lactalbumin is hydrolyzed, whereby the destabilized product can be easily washed to remove the lactose and minerals normally associated therewith.

3. In a process of destabilizing gel-like aqueous curds of lactalbumin precipitated from whey without forming a solution of the lactalbumin, the step which comprises subjecting said aqueous curds of lactalbumin which have been separated from the whey to the action of steam under a pressure of about 5 to 15 pounds per square inch for about 5 to 30 minutes while maintaining the lactalbumin in a solid state to destabilize the protein, whereby the destabilized product can be easily washed to remove the lactose and minerals normally associated therewith.

4. In a process of purifying crude gel-like lactalbumin curds precipitated from whey without forming a solution of the lactalbumin, the step which comprises subjecting aqueous curds of lactalbumin which have been separated from the whey to the action of steam under a pressure of about 15 pounds per square inch for about 15 minutes while maintaining the lactalbumin in a solid state, thereafter agitating the treated lactalbumin with water and removing the water, whereby lactose and minerals are washed from the lactalbumin.

5. In a process of purifying gel-like aqueous curds of crude lactalbumin obtained by precipitating from whey without forming a solution of the lactalbumin, the steps which comprise: admixing water with the gel-like curds of said lactalbumin which have been separated from the whey, heating the resulting mixture at a temperature approximately the boiling point of water for a period of between approximately 20 to 40 minutes while maintaining the lactalbumin in the solid state, and discontinuing said heating before the lactalbumin is hydrolized; thereby destabilizing the gel-like structure of the curds so that the lactose and minerals normally associated with the crude lactalbumin can be readily washed therefrom.

6. In a process of purifying the precipitated gel-like curds of crude lactalbumin obtained from whey without forming a solution of the lactalbumin, the steps comprising: admixing at least approximately one volume of water with the gel-like curds of said lactalbumin which have been separated from the whey, heating the said mixture at a temperature approximately the boiling point of water for approximately 30 minutes while maintaining the lactalbumin in the solid state, and discontinuing said heating before the said lactalbumin is hydrolized; thereby destabilizing the gel-like structure of the curds so that the lactose and minerals normally associated with the crude lactalbumin can be readily washed therefrom.

WILLIAM E. TRUCE.

REFERENCES CITED

The following references are of record in the file of this patent:

UNITED STATES PATENTS

| Number | Name | Date |
|---|---|---|
| 2,023,014 | Flanigan et al. | Dec. 3, 1935 |
| 2,188,908 | Lavett | Feb. 6, 1940 |
| 2,377,853 | Boyer | June 12, 1945 |

OTHER REFERENCES

"Utilisation of Whey," J. Royal Agriculture Society (England), vol. 83, pp. 73 to 96 (especially 77 and 78) (1922).